(12) United States Patent
Álvarez-Troncoso et al.

(10) Patent No.: US 7,076,350 B2
(45) Date of Patent: Jul. 11, 2006

(54) VEHICLE ENERGY MANAGEMENT SYSTEM USING PROGNOSTICS

(75) Inventors: Ignacio Álvarez-Troncoso, Valls-Tarragona (ES); Joan Fontanilles Piñas, Valls-Tarragona (ES); Jordi Mestre Guasch, Valls-Tarragona (ES)

(73) Assignee: Lear Corporation, Southfield, MI (US)

( * ) Notice: Subject to any disclaimer, the term of this patent is extended or adjusted under 35 U.S.C. 154(b) by 33 days.

(21) Appl. No.: 10/742,095

(22) Filed: Dec. 19, 2003

(65) Prior Publication Data

US 2005/0137764 A1    Jun. 23, 2005

(51) Int. Cl.
    *G06F 7/00*    (2006.01)
(52) U.S. Cl. .................................... 701/36
(58) Field of Classification Search ............. 701/36, 701/99, 106; 706/905, 907, 908, 913, 915; 429/13, 22–23
    See application file for complete search history.

(56) References Cited

U.S. PATENT DOCUMENTS

| 4,639,609 | A |  | 1/1987 | Floyd et al. |  |
|---|---|---|---|---|---|
| 5,818,673 | A |  | 10/1998 | Matsumaru et al. |  |
| 5,832,286 | A |  | 11/1998 | Yoshida |  |
| 5,856,711 | A |  | 1/1999 | Kato et al. |  |
| 5,859,845 | A |  | 1/1999 | Oniishi et al. |  |
| 5,956,702 | A | * | 9/1999 | Matsuoka et al. | 706/22 |
| 6,242,873 | B1 | * | 6/2001 | Drozdz et al. | 318/139 |
| 6,377,031 | B1 |  | 4/2002 | Karuppana et al. |  |
| 6,465,908 | B1 |  | 10/2002 | Karuppana et al. |  |
| 6,522,955 | B1 |  | 2/2003 | Colborn |  |
| 6,868,310 | B1 | * | 3/2005 | Nasman et al. | 700/291 |
| 2002/0171392 | A1 |  | 11/2002 | Richter et al. |  |
| 2003/0095367 | A1 |  | 5/2003 | Mares et al. |  |
| 2004/0253489 | A1 | * | 12/2004 | Horgan et al. | 429/13 |

OTHER PUBLICATIONS

Dr. H.M. Graf (Siemens VDO Automotive), CAN-Based Energy Management in Cars, Jan. 2003, pp. 16-20.
C. Lee Giles, et al., Noisy Time Series Prediction using a Recurrent Neural Network and Grammatical Inference, Jul./Aug. 2001, pp. 1-24.

* cited by examiner

*Primary Examiner*—Thu V. Nguyen
(74) *Attorney, Agent, or Firm*—MacMillan, Sobanski & Todd, LLC

(57) ABSTRACT

An energy management system for controlling an electrical system comprises data collection components, such as sensors, for providing quantified variables for forming an instantaneous state vector. A time series predictor generates an estimated future vector value in response to the instantaneous state vector. An electrical system manager includes predetermined decision rules invoked in response to the estimated future vector value to adapt the electrical system to expected electrical conditions.

13 Claims, 4 Drawing Sheets

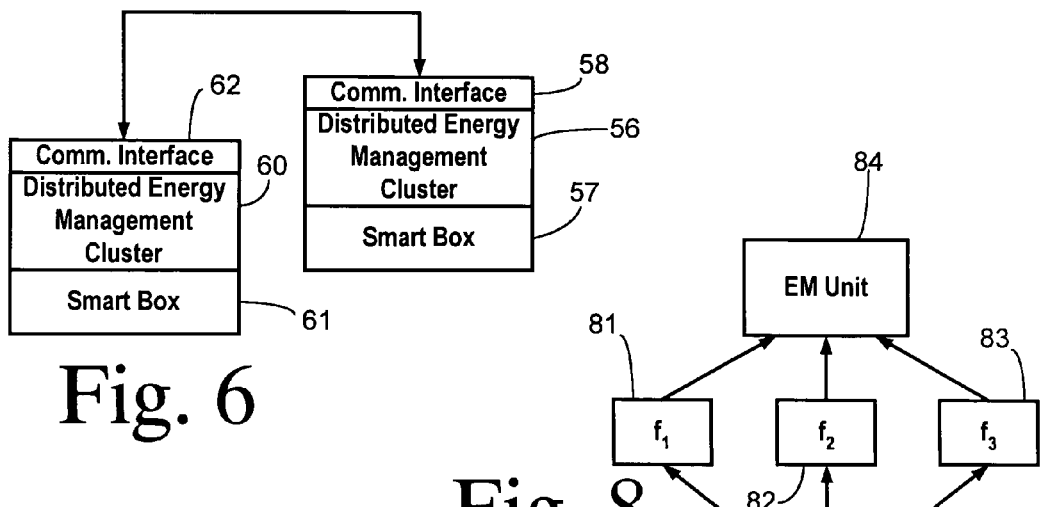
Fig. 6
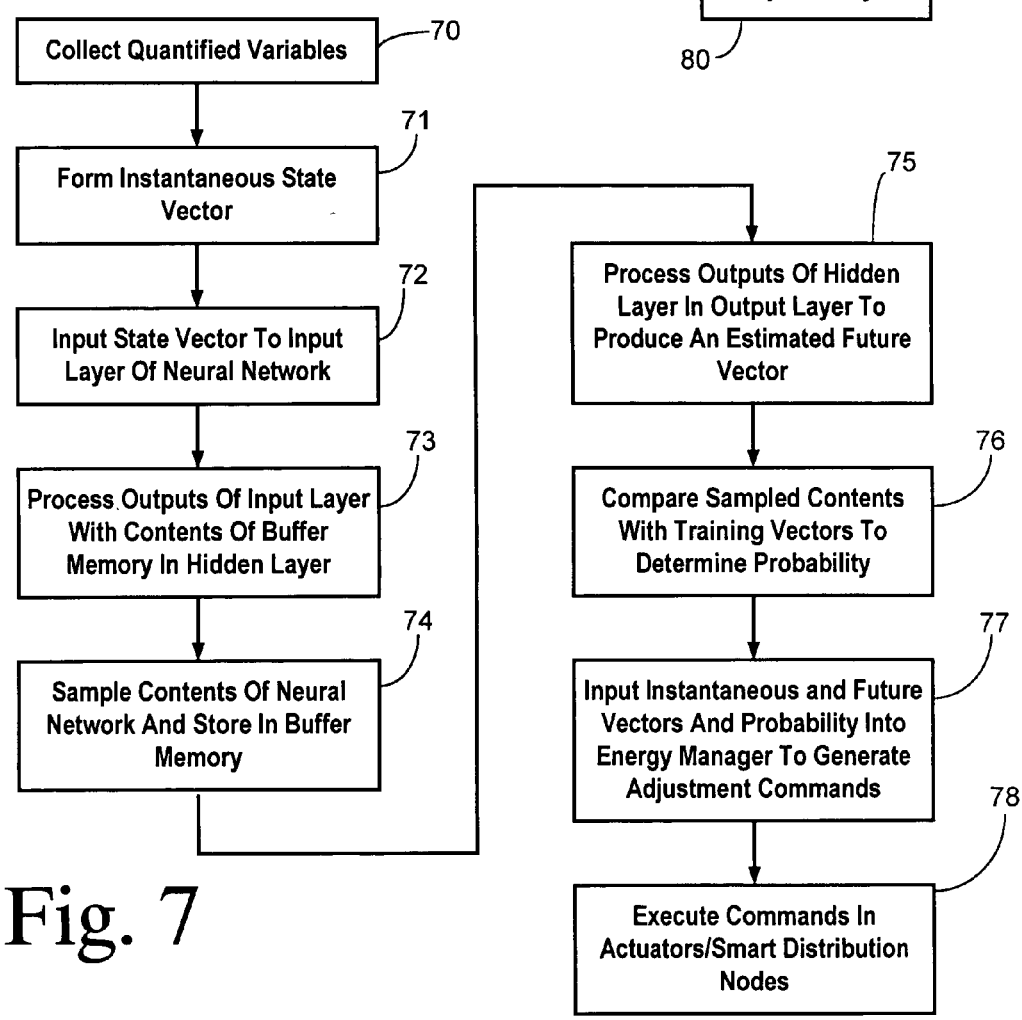
Fig. 8
Fig. 7

VEHICLE ENERGY MANAGEMENT SYSTEM USING PROGNOSTICS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to controlling electrical systems in vehicles, and, more specifically, to use of a time-series predictor to improve energy management of an electrical system.

Systems for generating, storing, conditioning, and using electric power in motor vehicles are becoming increasingly complex. New electrical functions, the increased use of power assist systems such as electric power-assist steering, new types of power generation systems such as integrated starter-alternator systems, fuel cells, dual battery systems, and 42-volt systems, require increasingly sophisticated control systems. Furthermore, the limited power capacity on a vehicle makes it desirable to be able to prioritize power delivery to various loads when electrical demand approaches or exceeds available supply.

Electrical energy, power, and load management systems, referred to herein as energy management (EM) systems, have been developed for coordinating the action of electrical system components to balance generated power with power consumption, protect components from harmful electrical conditions, and to utilize electrical capacity according to safety and other considerations. Due to the large number of interacting electrical components competing for capacity and each having various kinds of influences on electrical system performance, energy management strategies have become more extensive and complex. Consequently, it becomes necessary to develop expert systems, which can recognize performance issues using a minimum amount of sensed data on functional behavior of the electrical system. However, the complex electrical systems in modern vehicles are characterized by high nonlinearity (e.g., stability of power flow, battery and alternator performance and interaction, and load current profiles) which are difficult to model.

In order to provide superior performance, an EM strategy should recognize potential malfunctions in advance in order to reconfigure the electrical system to avoid such malfunction. However, advance prediction of the electrical system state is even more resource intensive and complicated. Thus, a system for predicting the state of the electrical system based on current conditions and using reduced processing resources would be desirable.

SUMMARY OF THE INVENTION

The present invention has the advantage of providing an energy management control system for managing events in an electrical system based on forecasted states to avoid degraded electrical system performance without excessive processing requirements.

In one aspect of the invention, an energy management system for controlling an electrical system comprises data collection components, such as sensors and I/O channels, for providing quantified variables for forming an instantaneous state vector. A time series predictor generates an estimated future vector value in response to the instantaneous state vector. An electrical system manager includes predetermined decision rules invoked in response to the instantaneous measured vector, the estimated future vector, and the associated likelihood of the forecasted event in order to adapt the electrical system to expected electrical conditions.

BRIEF DESCRIPTION OF THE DRAWINGS

FIG. 6 is a block diagram showing a distributed implementation of an energy management system.

FIG. 7 is flowchart showing a preferred method of the present invention.

FIG. 8 is a block diagram showing a further embodiment of the invention wherein different functional performance tasks are handled by separate neural network units.

DETAILED DESCRIPTION OF PREFERRED EMBODIMENTS

A typical electrical energy, power, and load management (EM) system controls power generation, storage, and consumption according to different operational states of a vehicle. The EM strategy optimizes the generation, distribution, and conversion of power in the vehicle electrical system as a function of electrical capacity/usage balancing, health status of electrical system components, and priority definitions for basic electrical system functions. Electrical system parameters that are monitored and controlled include load currents, battery state of charge (SOC), state of health (SOH), power generation capabilities of multiple sources (e.g., alternator and fuel cell), energy storage capabilities (e.g., ultracapacitors, regenerative braking), and power conversion capabilities (e.g., dc/dc and dc/ac converters). The controlled systems can include dual voltage architectures (e.g., 42/14 volt systems) and dual battery systems.

An EM system typically has the capability of disengaging lower priority loads during specific conditions in order to maintain sufficient power to higher priority (e.g., safety-related) loads. A typical EM strategy has included six vehicle operational modes, including a logistic mode, a parking mode, a cranking mode, a driving mode, and a degraded (i.e., limp home) mode.

The EM system is a control system for interfacing with a vehicle electrical system. The power paths (i.e., powerlines) are part of the conventional vehicle electrical system which may be controlled by providing certain actions to power actuators (i.e., switches) which are mostly contained in smart distribution nodes.

Figure 1:
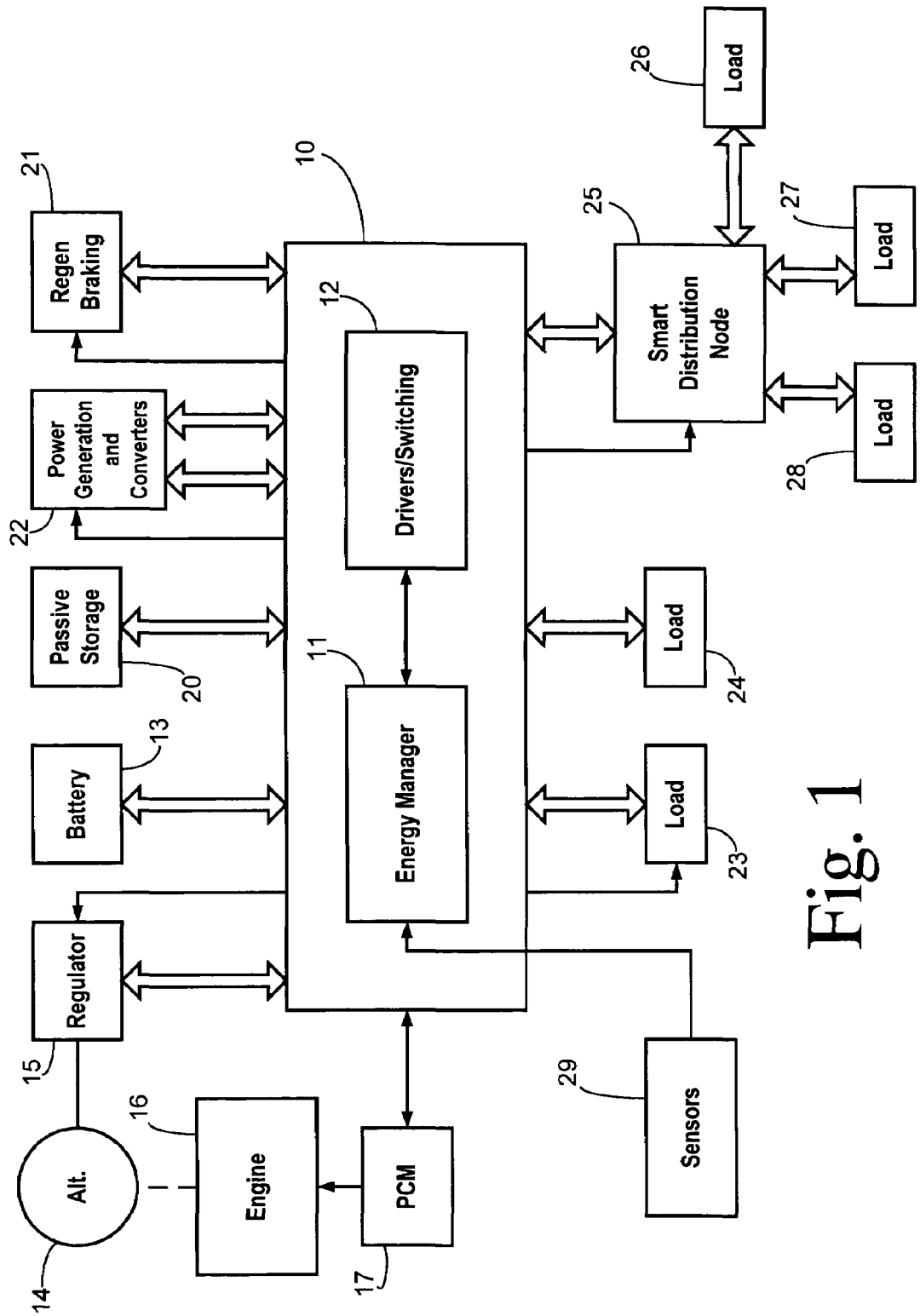
FIG. 1 is a block diagram showing a vehicle electrical system with energy management.

Referring to FIG. 1, and EM system 10 includes an energy manager unit 11 and a driving/switching module 12. EM system 12 controls and supervises power inputs from a plurality of sources including a battery 13 and an alternator 14/regulator 15. Alternator 14 is driven by an engine 16 under control of a powertrain control module (PCM) 17 interconnected with energy manager 11. Additional power sources include a passive storage unit 20 (such as a super-capacitor), a regenerative braking unit 21, and a power converter 22. EM system 10 controls electrical power via driver/switching unit 12 to a plurality of loads including a load 23, a load 24, and a smart distribution node (SDN) 25 which feeds power to loads 26, 27, and 28. Smart distribution node 25 is a known type of component, which includes a switching function and a processing function responsive to control and apply signals from EM system 10. EM system 10 can also be integrated with SDN 25, if desired. A plurality of sensors and I/O sampling channels 29 are coupled to energy manager 11 for providing quantified variables defining the state or status of the vehicle electrical system. Energy manager 11 uses the quantified variables from sensors 29 and other quantified variables obtained from the power sources, loads, and smart distribution nodes in the electrical system.

Figure 2:
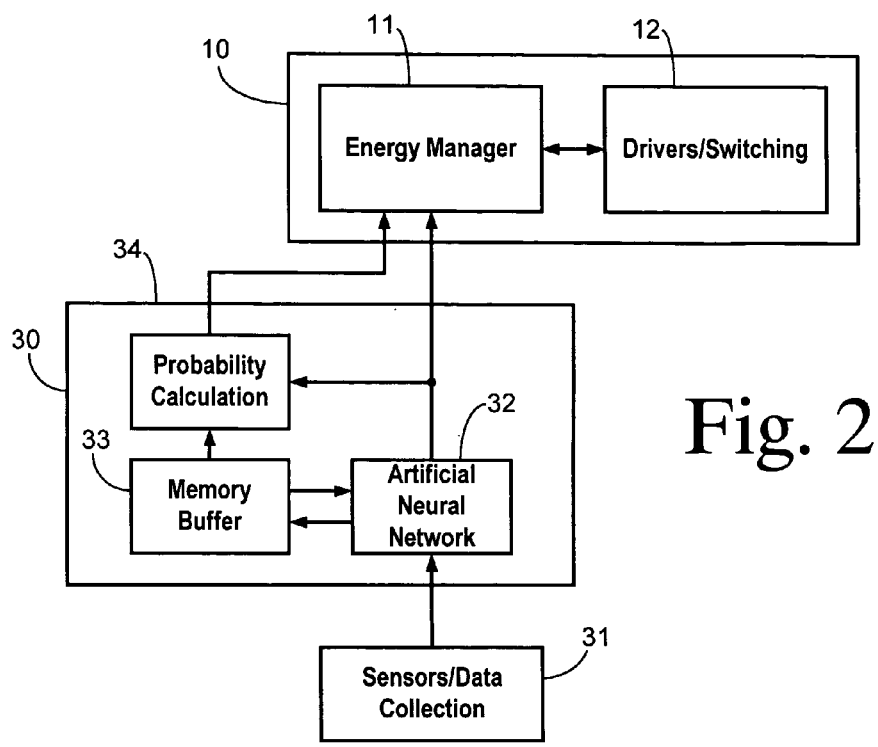
FIG. 2 is a block diagram showing the time-series predictor of the present invention coupled to the energy manager.

The present invention provides enhanced energy management by providing and ability to forecast a future state of the electrical system in order to quickly react to and even prevent undesirable states of the electrical system. As shown in FIG. 2, a time-series predictor 30 is coupled between electrical system energy manager 11 and a data collection block 31 including sensors and other electrical system components. Time-series prediction is a known technique for modeling the time variant performance of complex system. In time-series prediction, future values of state variables of a system are predicted based on a sequence of values observed in the past. Artificial neural networks (ANN) are often used to implement a time-series predictor. In particular, a feedforward network is commonly used wherein ANN weights are adjusted during a training process using sampled data obtained during controlled operation of the modeled system. Time-series predictor 30 comprises an artificial neural network (ANN) 32 coupled to a memory buffer 33 and a probability calculator block 34.

In order to accurately predict upcoming system states, a short-term memory (STN) in memory buffer 33 is used to extract and store temporal relationships between patterns of internal ANN data, thereby forming a recurrent ANN. The current state vector comprised of the quantified variables obtained by the data collection components may be designated as a function $\vec{x}(t)$. For a discrete implementation, the next value of the state vector (i.e., an estimated future vector value) is a function of the current state as follows:

$$\vec{x}(t+1) = f(\vec{x}(t))$$

A standard ANN method for performing time-series prediction captures an implicit behavior of a system in a feedforward network using a Radial Basis Function (RBF) architecture, for example.

Figure 3:
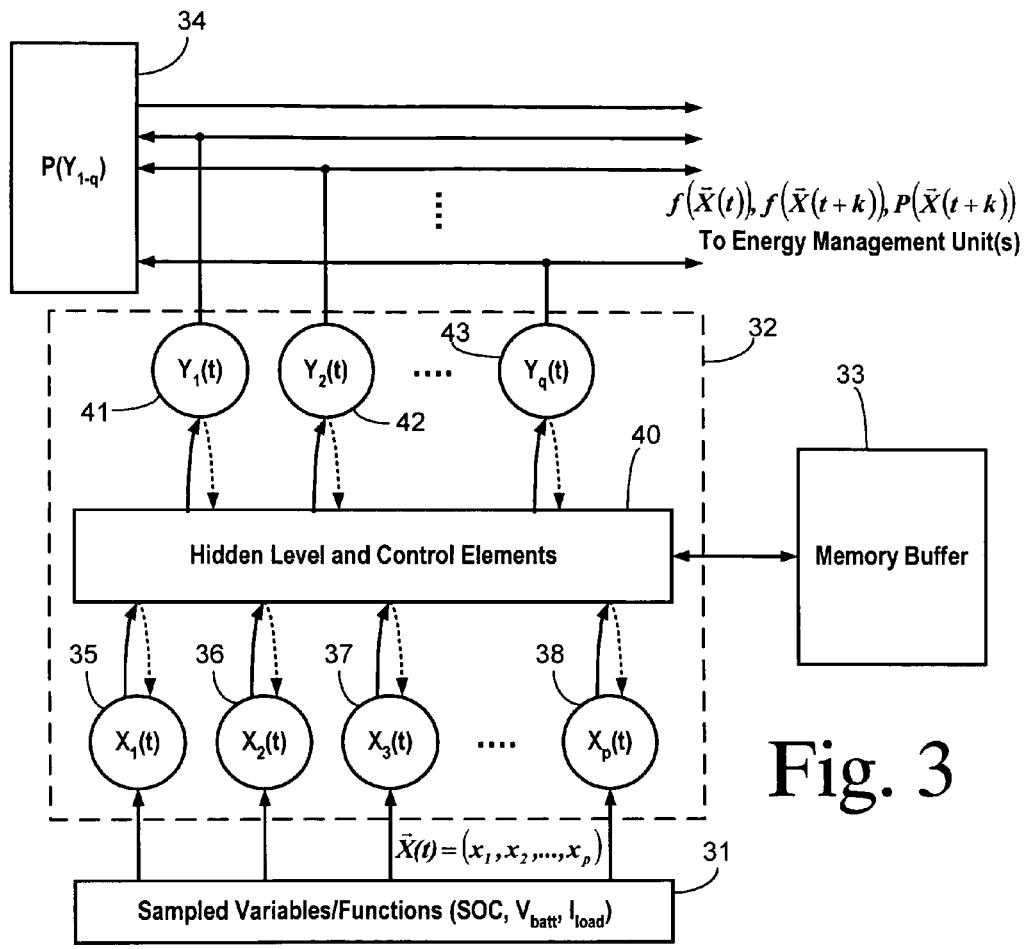
FIG. 3 is a block diagram showing another embodiment of the invention.

FIG. 3 shows a preferred ANN structure. A plurality of sampled variables 31 provides the instantaneous state vector $\vec{X}(t)$ as follows:

$$\vec{X}(t) = (x_1, x_2, \ldots, x_n)$$

where $x_1$, $x_2$, and $x_n$ are the sampled variables. Each sampled variable is coupled to a respective input node 35–38 of the input layer of ANN 32. Input nodes 35–38 are coupled to hidden level and control block 40 which feeds its output signals to an output layer including nodes 41–43. Memory buffer 33 is coupled directly to hidden level and control block 40. Output signals from output nodes 41–43 are coupled to probability calculator block 34. The output signals from output nodes 41–43 together with an output signal from probability calculator block 34 are provided to the energy manager as a vector represented by:

$$f(\vec{X}(t)), f(\vec{X}(t+k)), P(\vec{X}(t+k))$$

where $\vec{X}(t)$ is a current state of the electrical system as recognized by ANN 32, $\vec{X}(t+k)$ is an estimated future state, and $P(\vec{X}(t+k))$ is the probability of the estimated future state occurring.

Times-series prediction extracts patterns from sampled features of a controlled function, which varies along an open time window (such as controlling idle speed after engine cranking). Processing temporal sequences using an ANN involves three types of tasks: sequence recognition, temporal association, and sequence generation. The complexity of the sequence recognition task is case-dependent. Temporal sequences can have various degrees of complexity due in part to system parameters or system states that are shared or reported by more than one device. Another factor that significantly affects the complexity of the sequence processing is the dimension of the input space. The desired generalization, adaptability, fault tolerance, plasticity, and easy programming ability of ANN based controls make them arise as suitable solution for developing this intended task. Two approaches that have been used to develop ANN to handle temporal sequences include 1) insertion of an external memory buffer and 2) use of feedback connections (i.e., an internal memory mechanism) to construct recurrent ANN.

Times series are comprised of sequences of measurements of one or more visible variables of an underlying dynamic system, whose state changes with time as a function of its current state vector $\vec{X}(t)$. For the discrete case, the next value of the state is a function of the current state:

$$\vec{X}(t+1) = f(\vec{X}(t)).$$

In real control systems, the structure of the state space is obscure and the variables that contribute to the state vector may be unknown or debatable. The tasks to be performed by a time series predictor can be stated as obtaining measurements of sufficient components of the state vector of a dynamic system, reconstructing the (possible) dynamics of the system in the phase state, and predicting the evolution of the measured variables.

As known from embedding theorem, a wide enough feature vector extracted from the dynamical system will capture the structure of the original phase space. The standard ANN method of performing time series prediction is to capture this implicit behavior function in a feedforward network or Radial Basis Function architecture. Studies using associative memories have been carried out, including those based on bidirectional associative memories and Hopfield models. So the problem is to find a function $f: \Re^n \Rightarrow \Re$ in such a way that an estimate value of $\vec{X}(t+k)$ from n steps back from time t could be obtained, thus $$\vec{X}(t+k) = f(\vec{X}(t), \vec{X}(t-1), \ldots, \vec{X}(t-n))$$

The hybrid prediction model of FIG. 3 comprising an ANN and an external memory buffer is well suited to performing the above tasks. Basically, the adaptive system of FIG. 3 provides a feedforward, two-fold neural network. The input and output layers are formed with p and q processing units, respectively. Both layers are fully connected with the hidden layer and control, so that a feedback strategy can be carried out. The control elements 40 are connected by a data bus to non-adaptive memory buffer 33 which stores sampled features (i.e., signal values from the processing elements in ANN 32) in FIFO (first in, first out) mode. The stored signals are returned to ANN 32 after passing through the FIFO buffer thereby providing a time-window history of the system behavior.

Probability calculator 34 computes a probability value based on the similarity ratio of the input given to ANN 32 by memory buffer 33 to any of the a-priori classes defined in the training algorithm for adjusting the ANN connection weights.

The times-series ability of an ANN depends on its training or learning stage wherein internal ANN parameters are set, such as weighted connection values and transfer functions of processing units/elements. In order to account for all the profile features of different control variables into the ANN, a preferred learning procedure is implemented including sub-procedures for determining the processing element (PE) transfer functions and a connection weight matrix. A radial basis function (RBF) neuronal structure is preferably used. The input and output layers consist of groups of processing units that give a response (which may be either analog or digital) when supplied with an input vector. Each PE's transfer function needs to be configured just one time at the very beginning of the process by centering each curve in the input vector's space and assigning a spectrum width to it.

For each system-controlled EM function, parameter data sets obtained from operating or simulated prototype systems must be obtained for training the network. Any known method can be selected for establishing the center and width of the RBF functions. Once the functions are defined, a time-series sequence from each function is sampled and stored.

The determination of matrix weights is performed as follows (although any known method can be used for establishing them). From each time-series there is a sequence of vectors $\vec{X}(t)$, where t represents elapsed time and t=0, 1, 2, ..., n. This will be the training set for this stage. For defining connection weights and accounting for a quickly evolving system, a balanced iterative correction method for weight adjustment may be used. Specifically, the unidirectional connection weight from $PE_i$ at first layer to $PE_j$ of second layer ($w_{ij}$) is defined as follows:

$$w_{ij}(t+1) = w_{ij}(t) + \alpha \delta_{ij}(t)$$

where $\alpha$ is the learning speed term, and $\delta_{ij}(t)$ is the error term for time slot t. Once a training set is defined, a supervised learning method is applied. The weight matrix is changed sequentially until each individual error is minimized for each respective data frame. The same procedure is applied for the whole time-series sequence until a satisfactory convergence is obtained. At the end of the training period, the ANN system reflects the desired function $f: \Re^n \Rightarrow \Re$ that produces an estimated value of $\vec{X}(t+k)$ from n steps back from time t. The likelihood or probability of that forecasted event is evaluated by analyzing the similarity or belonging ratio between the input sequence being classified and a corresponding training vector. Let $\vec{X}(t)$ and $\vec{X}(t+k)$ be two vectors of the input time-series space, then $\vec{P}(\vec{X}(t))$ is the probability vector at time t that $\vec{X}(t+k)$ occurs in system at time t+k. It is defined as:

$$\vec{P}(\vec{X}(t)) = \left( \frac{f_1(\vec{X}(t))}{f_1(\vec{r}_1)}, \frac{f_2(\vec{X}(t))}{f_2(\vec{r}_2)}, \ldots, \frac{f_n(\vec{X}(t))}{f_n(\vec{r}_n)} \right)$$

where $\vec{r}_n$ is a corresponding training vector. Once the learning stage is finished and the ANN system is programmed, the system is ready to be applied for function prediction.

Figure 4:
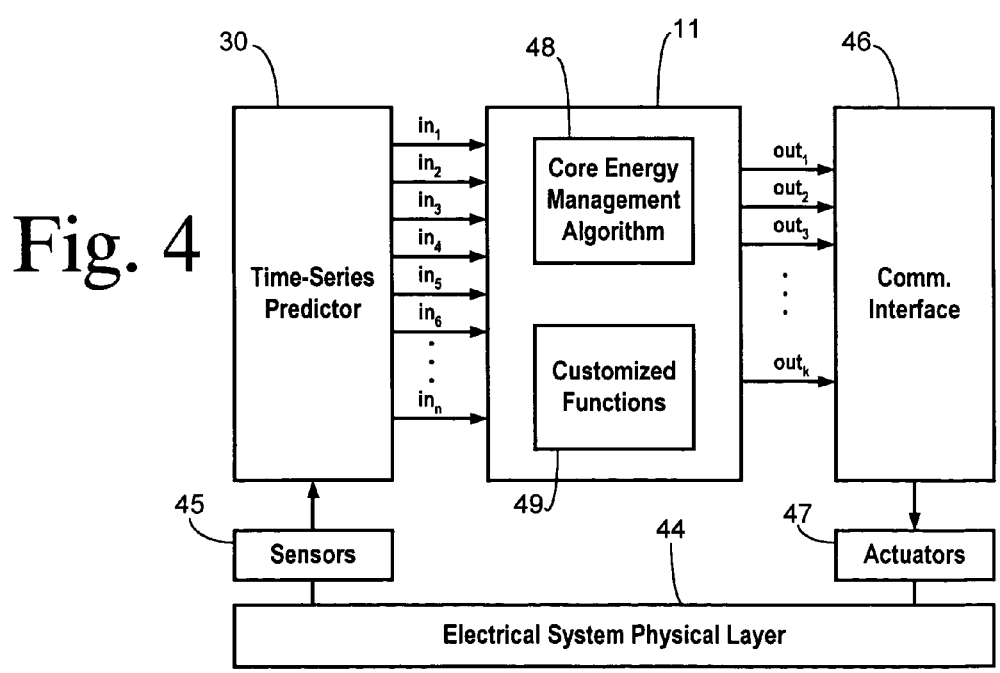
FIG. 4 is a block diagram showing the time-series predictor in greater detail.

FIG. 4 shows an overall vehicle system of the present invention for controlling a plurality of features or functions of the electrical system. In this embodiment, time-series predictor 30 generates a plurality of n future factor values designated as $in_1$ through $in_n$. The electrical system physical layer or plant 44 is monitored by sensors 45 which provide quantified variables to time-series predictor 30. Each estimated future vector value $in_n$ corresponds to a respective electrical system function or feature which provides a basis for controlling specific parameters of electrical system 44. Energy manager 11 includes a core energy management algorithm 48 and customized functions block 49. These elements respond to the estimated future vector values to produce output control signals $out_1$ through $out_k$ in order to control actuators 47 through a communication interface 46.

Energy management controller 11 is divided into a core energy management algorithm 48 and customized functions 49 in order to provide a portable, flexible programming structure to facilitate a system which is easily customizable to different vehicles, electrical system architectures, and system platforms. Core algorithm 48 may include a plurality of general sub-algorithms common to all vehicle electrical systems and various universal functional elements. Core sub-algorithms preferably include an electrical energy storing manager, a battery manager, a quiescent current manager, a dynamic load manager, and a dynamic power generation and conversion manager, for example. Customized functionality in customized function block 49 includes specialized sub-algorithms such as a sub-algorithm for generating switching signals to reduce alternator torque while accelerating, a sub-algorithm for generating switching signals to reduce the alternator torque while starting, a sub-algorithm for determination of load responses, and a sub-algorithm for generating load responses via an alternator interface unique to certain vehicles. Other general sub-algorithms within the core element may include an algorithm for storing an action history for diagnostic purposes, an algorithm for outputting switching signals via a CAN-BUS (or other appropriate communication protocol), or an algorithm for generating control signals for controlling idle speed. Preferably, specific interfaces are predefined for achieving communication between core algorithm 48 and customized functions block 49.

Figure 5:
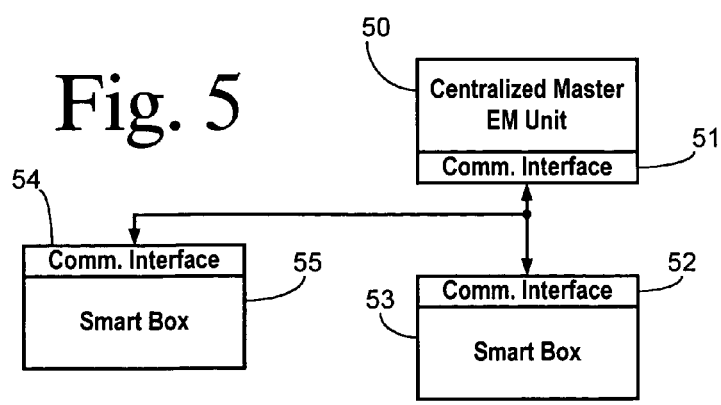
FIG. 5 is a block diagram showing a centralized implementation of an energy management unit.

Both core algorithm 48 and customized function block 49 implement energy management decision rules invoked in response to estimated future vector values for adapting the controlled electrical system to expected electrical conditions. In other words, an energy management decision for transmitting to actuators (such as electronic switches, smart distribution nodes, electromechanical components, and software drivers) is selected based on the estimated future vector value for a particular vehicle feature. For example, vehicle measurements demonstrating that a measured power-rail voltage is below a predetermined desired voltage or leading to an estimated future vector value showing that a deficient voltage is imminent, then a decision rule may provide for an increase in idle speed to boost the power being generated. The energy management algorithm of the present invention may be housed in a centralized master controller for the electrical system or may be distributed among certain modules. As shown in FIG. 5, a centralized master energy management unit 50 includes a communication interface 51 for communicating with a smart box 53 via a communication interface 52 and a smart box 55 via a communication interface 54. Although only two smart boxes are shown, generally a number N smart boxes would be present. Smart boxes 53 and 55 may be comprised of smart distribution nodes, for example. Centralized master EM unit 50 may further comprise a driving/switching unit as shown in FIG. 1. Unit 50 can also be integrated into one of the smart boxes while still providing a centralized operation for all the smart boxes.

Rather than a central electronic module as shown in FIG. 5, a distributed architecture may be employed as shown in FIG. 6. Thus, a first module includes a distributed energy management cluster 60 integrated with a smart box 61 and a communication interface 62 which communicates with a communication interface 58 integrated with a distributed energy management cluster 56 and a smart box 57. Although only two cluster/smart boxes are shown, generally a number N cluster/smart boxes would be present.

A preferred method of the present invention is shown in FIG. 7. In step 70, quantified variables are collected (e.g., as sensor signals from various sensors coupled to the electrical system or as stored signals in electronically controlled elements of the electrical system). In the instantaneous state vector of the collected quantified variables is formed in step 71. In step 72, the instantaneous state vector is input to the input layer of the times-series predictor (i.e., neural network).

In step 73, the outputs of the input layer are processed along with the contents of the buffer memory within the hidden layer of the neural network. In step 74, the contents of the neural network are sampled and stored in the buffer memory to provide the time history upon which subsequent predictions can be made. The outputs of the hidden layer are processed in step 75 to produce an estimated future vector. The sampled contents from step 74 may be compared with the corresponding training vectors to determine the probability of the estimated future vector in step 76.

The estimated future vector, the associated probability, and a current vector state are input to the energy manager in step 77 to generate adjustment commands for the electrical system. In step 78, the actuators and/or the smart distribution nodes of the electrical system execute the commands from the energy manager.

FIG. 8 shows an embodiment of the present invention wherein a physical layer 80 of the electrical system is coupled to three independent time-series predictors 81–83 for implementing time-series prediction functions $f_1$–$f_3$. The outputs of time-series predictors 81–83 are coupled to an EM Unit 84 for controlling electrical system operation. The time-series predictors operating in parallel may each be responsible for a particular actuating system or controlled feature, such as a battery monitor, idle speed, battery state of charge, and load management.

Preferably, each time-series predictor 81–83 regulates a different aspect of electrical system behavior. In the example of idle speed control, generated power appearing on or at a predetermined power-rail or distribution point may be regulated.

The improved operation of the present invention can be shown by considering the following scenario in connection with idle speed control. Prior to engine starting, a vehicle EM system is in its parking mode. After cranking the starter motor to start the vehicle engine, the electrical system should be stabilized at a nominal power supply voltage of about 14 volts and idle speed of about 800 rpm so that the vehicle battery begins recharging. During the parking mode, the electrical system may be burdened with an application of a hard electrical load that could create a large voltage drop (depending on the initial status of the battery) which may be a concern with regard to other forthcoming electrical events (e.g., energy demands from higher priority loads). The application of certain loads and/or the drop in main power supply voltage may be predictable based on measured electrical system variables. The present invention detects this scenario and the energy management algorithm may contain a decision rule for increasing idle speed thereby avoiding battery discharge or the voltage drop to the main power supply. Thus, the battery may continue charging and sufficient current continues to be supplied to the loads. Anticipation of the energy short fall allows severe electrical system malfunctions to be avoided and protects the battery.

What is claimed is:

1. An energy management system for controlling an electrical system, comprising:

data collection components providing quantified variables for forming an instantaneous state vector;

a time series predictor comprising an artificial neural network for generating an estimated future vector value in response to said instantaneous state vector, wherein said time series predictor further comprises a memory buffer coupled to said artificial neural network for time sampling contents of said artificial neural network and providing said time sampled contents to said artificial neural network when generating a subsequent estimated future vector value;

a probability calculator for generating a probability value in response to comparing said time sampled contents with a predetermined set of training vectors; and an electrical system manager including predetermined decision rules invoked in response to said estimated future vector value and said probability value to adapt said electrical system to expected electrical conditions.

2. The energy management system of claim 1 wherein said artificial neural network is comprised of a feed-forward network.

3. The energy management system of claim 1 wherein said electrical system comprises an automotive electrical system of an automotive vehicle and wherein said data collection components are comprised of sensors connected within said automotive vehicle for generating said quantified variables in response to dynamic behavior of said automotive electrical system.

4. The energy management system of claim 3 further comprising:

a plurality of electrical system actuators responsive to commands from said electrical system manager according to said predetermined decision rules.

5. The energy management system of claim 3 further comprising:

a plurality of smart distribution nodes within said automotive electrical system; and a communication network coupling said plurality of smart distribution nodes.

6. The energy management system of claim 5 wherein said electrical system manager is distributed among said smart distribution nodes.

7. The energy management system of claim 1 further comprising a central module containing said electrical system manager.

8. The energy management system of claim 1 wherein said electrical system manager comprises an electrical energy storing manager, a battery manager, a quiescent current manager, a dynamic load manager, and a dynamic power generation and conversion manager for providing a core functionality.

9. The energy management system of claim 8 wherein said electrical system manager further comprises a customized function manager for providing an add-on functionality.

10. A method of managing electrical energy within an electrical system, said method comprising the steps of:
   collecting a plurality of quantified variables corresponding to said electrical system;
   forming an instantaneous state vector;
   inputting said instantaneous state vector into an input layer of an artificial neural network of a time series predictor;
   processing outputs of said input layer together with outputs of a buffer memory in a hidden layer of said artificial neural network;
   time sampling predetermined contents of said artificial neural network in said buffer memory for processing in said hidden layer with a subsequent time sample of said quantified variables;
   processing outputs of said hidden layer in an output layer of said artificial neural network to produce an estimated future vector of said quantified variables;
   comparing said time sampled predetermined contents with a predetermined set of training vectors to identify a probability value; and
   adjusting said electrical system in response to said estimated future vector and said probability value.

11. The method of claim 10 wherein said adjusting step is comprised of:
   generating commands in an electrical system energy manager in response to said estimated future vector according to predetermined decision rules; and
   providing said commands to a plurality of electrical system actuators.

12. The method of claim 11 wherein said plurality of electrical system actuators include a plurality of smart distribution nodes.

13. The method of claim 12 wherein said electrical system manager is distributed among said smart distribution nodes.

* * * * *